US009525548B2

(12) United States Patent
Marshall et al.

(10) Patent No.: US 9,525,548 B2
(45) Date of Patent: Dec. 20, 2016

(54) PROVISIONING TECHNIQUES

(75) Inventors: Alan L. Marshall, Kirkland, WA (US); Kamran Rajabi Zargahi, Seattle, WA (US); Miller Thomas Abel, Mercer Island, WA (US); Murali Krishnan, Redmond, WA (US); Anoop Anantha, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 12/909,178

(22) Filed: Oct. 21, 2010

(65) Prior Publication Data
US 2012/0099727 A1   Apr. 26, 2012

(51) Int. Cl.
H04L 9/08 (2006.01)
H04L 29/06 (2006.01)
H04W 12/02 (2009.01)

(52) U.S. Cl.
CPC ......... *H04L 9/0825* (2013.01); *H04L 63/0442* (2013.01); *H04W 12/02* (2013.01); *H04L 2209/80* (2013.01)

(58) Field of Classification Search
USPC ....................................... 380/255
See application file for complete search history.

(56) References Cited

U.S. PATENT DOCUMENTS

| 5,394,609 A | 3/1995 | Ferguson et al. |
| 5,533,123 A | 7/1996 | Force et al. |
| 5,544,246 A | 8/1996 | Mandelbaum et al. |
| 5,590,038 A | 12/1996 | Pitroda |
| 5,649,118 A | 7/1997 | Carlisle et al. |
| 5,650,761 A | 7/1997 | Gomm et al. |
| 5,878,400 A | 3/1999 | Carter, III |
| 5,953,710 A | 9/1999 | Fleming |
| 5,987,425 A | 11/1999 | Hartman et al. |
| 6,061,660 A | 5/2000 | Eggleston et al. |
| 6,085,976 A | 7/2000 | Sehr |
| 6,088,451 A | 7/2000 | He et al. |

(Continued)

FOREIGN PATENT DOCUMENTS

| CN | 1502186 | 6/2004 |
| CN | 1589424 | 3/2005 |

(Continued)

OTHER PUBLICATIONS

Ekberg, et al., "On-board Credentials with Open Provisioning", Retrieved at <<http://research.nokia.com/files/NRCTR2008007.pdf, Aug. 29, 2008, pp. 18.

(Continued)

*Primary Examiner* — Taghi Arani
*Assistant Examiner* — Phy Anh Vu
(74) *Attorney, Agent, or Firm* — Daniel Choi; Micky Minhas

(57) ABSTRACT

Provisioning techniques are described. In implementations, a particular one of a plurality of public keys are located using an identifier included in a request received via a network. The located public key is communicated via the network, the public key configured to encrypt data that is to be decrypted by a secure element of a mobile communication device, the secure element implemented using hardware and including a private key that is configured to decrypt the data that was encrypted using the public key.

20 Claims, 6 Drawing Sheets

(56) References Cited

U.S. PATENT DOCUMENTS

| | | | |
|---|---|---|---|
| 6,102,287 A | 8/2000 | Matyas, Jr. | |
| 6,219,439 B1 | 4/2001 | Burger | |
| 6,230,267 B1 | 5/2001 | Richards et al. | |
| 6,314,425 B1 | 11/2001 | Serbinis | |
| 6,372,331 B1 | 4/2002 | Terada et al. | |
| 6,615,171 B1 | 9/2003 | Kanevsky et al. | |
| 6,711,263 B1 | 3/2004 | Nordenstam et al. | |
| 6,754,833 B1* | 6/2004 | Black | G06F 21/41 713/169 |
| 6,766,454 B1 | 7/2004 | Riggins | |
| 6,792,536 B1 | 9/2004 | Teppler | |
| 6,883,718 B1 | 4/2005 | Le et al. | |
| 6,932,270 B1 | 8/2005 | Fajkowski | |
| 7,257,545 B1 | 8/2007 | Hung | |
| 7,388,957 B2 | 6/2008 | Ono et al. | |
| 7,437,329 B2 | 10/2008 | Graves | |
| 7,463,898 B2 | 12/2008 | Bayne | |
| 7,600,676 B1 | 10/2009 | Rados et al. | |
| 7,628,322 B2 | 12/2009 | Holtmanns et al. | |
| 7,647,243 B2 | 1/2010 | Woolston | |
| 7,647,430 B2 | 1/2010 | Ng et al. | |
| 7,698,566 B1* | 4/2010 | Stone | H04L 63/08 713/186 |
| 7,769,633 B2 | 8/2010 | Jokinen | |
| 7,774,238 B2 | 8/2010 | Gopalpur et al. | |
| 7,805,379 B1 | 9/2010 | Adkins, III et al. | |
| 7,840,494 B2 | 11/2010 | Wiederin | |
| 7,996,331 B1 | 8/2011 | Solanki et al. | |
| 8,484,708 B2 | 7/2013 | Chern | |
| 8,511,552 B2 | 8/2013 | Habraken | |
| 8,805,434 B2 | 8/2014 | Vasudevan | |
| 9,026,171 B2 | 5/2015 | Vasudevan | |
| 2001/0042010 A1 | 11/2001 | Hassell | |
| 2002/0011517 A1 | 1/2002 | Namekawa et al. | |
| 2002/0023032 A1 | 2/2002 | Pearson | |
| 2002/0065713 A1 | 5/2002 | Awada | |
| 2002/0080968 A1* | 6/2002 | Olsson | 380/270 |
| 2002/0087876 A1 | 7/2002 | Larose | |
| 2002/0123938 A1 | 9/2002 | Yu et al. | |
| 2002/0146125 A1 | 10/2002 | Eskicioglu et al. | |
| 2002/0150243 A1* | 10/2002 | Craft | H04L 63/0823 380/201 |
| 2003/0028469 A1 | 2/2003 | Bergman et al. | |
| 2003/0052864 A1 | 3/2003 | Sert | |
| 2003/0061111 A1 | 3/2003 | Dutta et al. | |
| 2003/0108039 A1* | 6/2003 | Shell | H04W 28/18 370/389 |
| 2003/0132284 A1 | 7/2003 | Reynolds et al. | |
| 2003/0163686 A1 | 8/2003 | Ward et al. | |
| 2003/0172262 A1* | 9/2003 | Curry | H04L 9/0825 713/156 |
| 2003/0177361 A1* | 9/2003 | Wheeler | G06F 21/32 713/176 |
| 2003/0204726 A1 | 10/2003 | Kefford et al. | |
| 2003/0208403 A1 | 11/2003 | Fisher et al. | |
| 2003/0236712 A1 | 12/2003 | Antonucci | |
| 2004/0068649 A1 | 4/2004 | Haller et al. | |
| 2004/0128197 A1 | 7/2004 | Bam et al. | |
| 2004/0128508 A1* | 7/2004 | Wheeler | G06F 21/33 713/170 |
| 2004/0193485 A1 | 9/2004 | Ilberg | |
| 2004/0206812 A1 | 10/2004 | Tamagno et al. | |
| 2004/0215963 A1 | 10/2004 | Kaplan | |
| 2004/0247115 A1 | 12/2004 | Ono et al. | |
| 2005/0015401 A1 | 1/2005 | Chang et al. | |
| 2005/0021982 A1 | 1/2005 | Popp et al. | |
| 2005/0079863 A1* | 4/2005 | Macaluso | H04W 4/00 455/419 |
| 2005/0090258 A1* | 4/2005 | Coppinger | G06F 8/65 455/436 |
| 2005/0111463 A1* | 5/2005 | Nepomuceno Leung | H04W 92/18 370/395.52 |
| 2005/0125451 A1 | 6/2005 | Mooney | |
| 2005/0137889 A1 | 6/2005 | Wheeler | |
| 2005/0137939 A1 | 6/2005 | Calabria et al. | |
| 2005/0154909 A1* | 7/2005 | Zhang et al. | 713/200 |
| 2005/0157872 A1 | 7/2005 | Ono et al. | |
| 2005/0164693 A1* | 7/2005 | Yach | H04L 12/5895 455/419 |
| 2005/0187873 A1 | 8/2005 | Labrou et al. | |
| 2005/0190764 A1* | 9/2005 | Shell | H04L 67/04 370/389 |
| 2005/0256778 A1 | 11/2005 | Boyd et al. | |
| 2005/0289047 A1 | 12/2005 | Oliver et al. | |
| 2006/0046842 A1 | 3/2006 | Mattice et al. | |
| 2006/0090081 A1 | 4/2006 | Baentsch et al. | |
| 2006/0091223 A1 | 5/2006 | Zellner et al. | |
| 2006/0173985 A1* | 8/2006 | Moore | G06F 17/3089 709/223 |
| 2006/0179309 A1 | 8/2006 | Cross et al. | |
| 2006/0213972 A1 | 9/2006 | Kelley et al. | |
| 2006/0224452 A1 | 10/2006 | Ng | |
| 2006/0236363 A1 | 10/2006 | Heard et al. | |
| 2007/0028118 A1 | 2/2007 | Brown et al. | |
| 2007/0038523 A1 | 2/2007 | Komem et al. | |
| 2007/0043636 A1 | 2/2007 | Foster | |
| 2007/0075133 A1 | 4/2007 | Yeager | |
| 2007/0095927 A1 | 5/2007 | Pesonen et al. | |
| 2007/0107050 A1 | 5/2007 | Selvarajan | |
| 2007/0156555 A1 | 7/2007 | Orr | |
| 2007/0180276 A1 | 8/2007 | Everett et al. | |
| 2007/0190939 A1 | 8/2007 | Abel | |
| 2007/0197261 A1 | 8/2007 | Humbel | |
| 2007/0235539 A1 | 10/2007 | Sevanto et al. | |
| 2007/0241182 A1 | 10/2007 | Buer | |
| 2007/0254712 A1 | 11/2007 | Chitti | |
| 2007/0278291 A1 | 12/2007 | Rans | |
| 2008/0011837 A1 | 1/2008 | Wesley | |
| 2008/0031459 A1* | 2/2008 | Voltz | H04L 9/083 380/279 |
| 2008/0033866 A1 | 2/2008 | Boswell et al. | |
| 2008/0039134 A1* | 2/2008 | Hattori et al. | 455/556.1 |
| 2008/0052233 A1 | 2/2008 | Fisher et al. | |
| 2008/0116264 A1 | 5/2008 | Hammad et al. | |
| 2008/0126145 A1 | 5/2008 | Rackley, III et al. | |
| 2008/0128513 A1 | 6/2008 | Hammad et al. | |
| 2008/0168266 A1 | 7/2008 | Sita et al. | |
| 2008/0189192 A1 | 8/2008 | Ronen et al. | |
| 2008/0208741 A1 | 8/2008 | Arthur et al. | |
| 2008/0214172 A1* | 9/2008 | Anwer | G06F 8/65 455/419 |
| 2008/0215636 A1 | 9/2008 | Lofgren et al. | |
| 2008/0223925 A1 | 9/2008 | Saito | |
| 2008/0248815 A1 | 10/2008 | Busch | |
| 2008/0255942 A1 | 10/2008 | Craft | |
| 2008/0262928 A1 | 10/2008 | Michaelis | |
| 2008/0270251 A1 | 10/2008 | Coelho et al. | |
| 2008/0280644 A1 | 11/2008 | Hugot | |
| 2008/0309451 A1 | 12/2008 | Zellweger et al. | |
| 2009/0036103 A1 | 2/2009 | Byerley et al. | |
| 2009/0037287 A1 | 2/2009 | Baitalmal et al. | |
| 2009/0097637 A1 | 4/2009 | Boscher et al. | |
| 2009/0143104 A1 | 6/2009 | Loh | |
| 2009/0191811 A1 | 7/2009 | Griffin et al. | |
| 2009/0192937 A1 | 7/2009 | Griffin et al. | |
| 2009/0193264 A1 | 7/2009 | Fedronic | |
| 2009/0198997 A1* | 8/2009 | Yeap et al. | 713/155 |
| 2009/0204806 A1 | 8/2009 | Kanemura et al. | |
| 2009/0205028 A1 | 8/2009 | Smeets et al. | |
| 2009/0234861 A1 | 9/2009 | Ramer et al. | |
| 2009/0265555 A1 | 10/2009 | Royer | |
| 2009/0270045 A1 | 10/2009 | Flaherty | |
| 2009/0271850 A1 | 10/2009 | Hoppe et al. | |
| 2009/0281947 A1 | 11/2009 | Erel | |
| 2009/0307132 A1 | 12/2009 | Phillips | |
| 2009/0312011 A1 | 12/2009 | Huomo et al. | |
| 2009/0325565 A1* | 12/2009 | Backholm | 455/419 |
| 2010/0010994 A1 | 1/2010 | Wittig et al. | |
| 2010/0042517 A1 | 2/2010 | Paintin et al. | |
| 2010/0042954 A1 | 2/2010 | Rosenblatt et al. | |
| 2010/0048226 A1 | 2/2010 | Owen et al. | |
| 2010/0049599 A1 | 2/2010 | Owen et al. | |

(56) References Cited

U.S. PATENT DOCUMENTS

| | | | |
|---|---|---|---|
| 2010/0057573 | A1 | 3/2010 | Singhal |
| 2010/0069096 | A1 | 3/2010 | Poola |
| 2010/0070364 | A1 | 3/2010 | Dugan |
| 2010/0088188 | A1 | 4/2010 | Kumar |
| 2010/0094694 | A1 | 4/2010 | Shapiro |
| 2010/0106583 | A1 | 4/2010 | Etheredge et al. |
| 2010/0125495 | A1 | 5/2010 | Smith et al. |
| 2010/0125510 | A1 | 5/2010 | Smith et al. |
| 2010/0146119 | A1 | 6/2010 | Lee |
| 2010/0153447 | A1 | 6/2010 | Johnson et al. |
| 2010/0163618 | A1 | 7/2010 | Yang et al. |
| 2010/0174598 | A1 | 7/2010 | Khan et al. |
| 2010/0280911 | A1 | 11/2010 | Roberts et al. |
| 2010/0317336 | A1 | 12/2010 | Ferren et al. |
| 2011/0010234 | A1 | 1/2011 | Lindelsee et al. |
| 2011/0055001 | A1 | 3/2011 | Mattern |
| 2011/0078773 | A1 | 3/2011 | Bhasin et al. |
| 2011/0276484 | A1 | 11/2011 | Pearson et al. |
| 2011/0305337 | A1 | 12/2011 | Devol et al. |
| 2012/0084138 | A1 | 4/2012 | Anantha |
| 2012/0089404 | A1 | 4/2012 | Rao |
| 2012/0089450 | A1* | 4/2012 | Anantha et al. ........... 705/14.23 |
| 2012/0109771 | A1 | 5/2012 | Zargahi |
| 2012/0129493 | A1 | 5/2012 | Vasudevan |
| 2012/0143669 | A1 | 6/2012 | Anantha |
| 2012/0143758 | A1 | 6/2012 | Anantha |
| 2012/0143769 | A1 | 6/2012 | Krishnan |
| 2012/0144201 | A1 | 6/2012 | Anantha |
| 2012/0196529 | A1 | 8/2012 | Huomo et al. |
| 2013/0138571 | A1 | 5/2013 | Vassilev et al. |
| 2014/0286492 | A1 | 9/2014 | Vasudevan |

FOREIGN PATENT DOCUMENTS

| | | |
|---|---|---|
| CN | 1645791 | 7/2005 |
| CN | 1757219 | 4/2006 |
| CN | 1930592 | 3/2007 |
| CN | 1934545 | 3/2007 |
| CN | 1947343 | 4/2007 |
| CN | 1988549 | 6/2007 |
| CN | 101064033 | 10/2007 |
| CN | 101304503 | 11/2008 |
| CN | 101341517 | 1/2009 |
| CN | 101576983 | 11/2009 |
| CN | 101657784 | 2/2010 |
| CN | 101657984 | 2/2010 |
| CN | 101681480 | 3/2010 |
| EP | 0933717 A2 | 8/1999 |
| GB | 2344678 A | 6/2000 |
| KR | 20070092773 | 9/2007 |
| KR | 20070120125 | 12/2007 |
| KR | 20080006694 | 1/2008 |
| TW | 200919354 | 5/2009 |
| WO | WO-2006031202 | 3/2006 |
| WO | 2008/157806 A2 | 12/2008 |
| WO | WO-2010039337 | 4/2010 |
| WO | 2010/056484 A2 | 5/2010 |
| WO | WO-2010079483 | 7/2010 |

OTHER PUBLICATIONS

"Foreign Office Action", CN Application No. 201110358418.6, Dec. 31, 2014, 12 Pages.
"Foreign Office Action", CN Application No. 201110340395.6, Jan. 12, 2015, 13 pages.
"Final Office Action", U.S. Appl. No. 12/959,715, Jan. 30, 2015, 32 pages.
"Ex Parte Quayle Action", U.S. Appl. No. 12/958,173, (Aug. 29, 2013), 5 pages.
"Final Office Action", U.S. Appl. No. 12/959,715, (Aug. 28, 2013), 26 pages.
"Non-Final Office Action", U.S. Appl. No. 12/899,861, (Aug. 15, 2013), 30 pages.
"Non-Final Office Action", U.S. Appl. No. 12/917,178, (Jul. 25, 2013), 39 pages.
"Non-Final Office Action", U.S. Appl. No. 12/952,754, (Jul. 15, 2013), 13 pages.
"Foreign Office Action", CN Application No. 201110317879.9, Mar. 13, 2015, 7 Pages.
"Foreign Office Action", CN Application No. 201110415296.X, Jan. 5, 2015, 8 pages.
"Final Office Action", U.S. Appl. No. 12/958,841, May 8, 2014, 26 pages.
"Foreign Office Action", CN Application No. 201110392619.8, May 14, 2014, 9 Pages.
"Non-Final Office Action", U.S. Appl. No. 12/898,131, May 13, 2014, 29 pages.
"Non-Final Office Action", U.S. Appl. No. 12/917,178, May 29, 2014, 48 pages.
"Non-Final Office Action", U.S. Appl. No. 12/958,173, Apr. 23, 2014, 10 pages.
"Non-Final Office Action", U.S. Appl. No. 12/959,715, Jul. 7, 2014, 29 pages.
"Contactless Loyalty Scheme Gets Boost From Deal with Acquirer", Retrieved from: <http://www.nfctimes.com/news/contactless-loyalty-scheme-gets-boost-deal-acquirer> on Oct. 20, 2010 (Aug. 17, 2010), 7 pages.
"Download Blaze Mobile Wallet for Mobile", Retrieved from: <http://www.getjar.com/mobile/18367/blaze-mobile-wallet/> on Oct. 19, 2010, (Jan. 28, 2010), 2 pages.
"FidBook, the first NFC application enabling easy-load loyalty cards on a NFC phone is launched in Nice.", Retrieved from: <http://krowne.wordpress.com/2010/06/04/fidbook-the-first-nfc-application-enabling-easy-load-loyalty-cards-on-a-nfc-phone-is-launched-in-nice/> on Oct. 22, 2010, (Jun. 4, 2010), 6 pages.
"Final Office Action", U.S. Appl. No. 12/952,754, (Dec. 6, 2012), 13 pages.
"Final Office Action", U.S. Appl. No. 12/958,773, (Aug. 29, 2012), 21 pages.
"Financial Forecast Center", Retrieved from: <http://www.forecasts.org/exchange-rate/> on Aug. 29, 2012, 4 pages.
"FireID Launches Mobile Two-Factor Authentication Platform For Online And Mobile Banking", available at <http://www.darkreading.com/insiderthreat/security/client/showArticle.jhtml?articleID=223900289>, (Mar. 17, 2010), 3 pages.
"Fresh Ideas for Building Profitable Customer Relationships", Retrieved from: <http://www.customerinsightgroup.com/loyaltyblog/>on Aug. 27, 2010, (Aug. 18, 2010), 16 pages.
"G&D's New Card Innovation on Display", Retrieved from: <http://www.gi-de.com/pls/portal/maia.display_custom_items.DOWNLOAD_FILE_BLOB?p_ID=139208&p_page_id=123329&p_pg_id=44> on Oct. 22, 2010 (2007), pp. 1-12.
"Get Mobile Coupons Through Your Android Phone With Local Search", available at <http://androidandme.com/2009/11/news/get-mobile-coupons-through-your-android-phone-with-local-search/>, (Nov. 24, 2009), 7 pages.
"GoMo Mobile Wallet", Retrieved from: <http://www.marketwire.com/press-release/GoMo-Wallet-Delivers-New-Class-Mobile-Commerce-Functionality-That-Changes-Transaction-1276550.htm> on Oct. 19, 2010, (Jun. 15, 2010), 2 pages.
"Mobile Phones to Open Doors: Philips and SK Telecom Launch NFC RFID Trial in Seoul", Retrieved from: <http://www.itu.int/ITU-D/cyb/newsloq/Mobile+Phones+to+Open+Doors+Philips+And+SK+Telecom+Launch+NFC+RFID+Trial+In+Seoul.aspx> on Oct. 19, 2010, (May 27, 2006), 3 pages.
"MobileID: A Mobile, Two-Way and Two-Factor Authentication", available at <http://www.deepnetsecurity.com/products2/mobileid.asp>, (2010), 2 pages.
"MobiQpons launches Free Service for Small Businesses to increase loyalty and repeat customers", Retrieved from: <http://www.prloq.org/10696328-mobiqpons-launches-free-service-for-small-businesses-to-increase-loyalty-and-repeat-customers.html> on Oct. 20, 2010, (May 24, 2010), 2 pages.
"Non-Final Office Action", U.S. Appl. No. 12/917,178, (Sep. 12, 2012), 36 pages.

(56) References Cited

OTHER PUBLICATIONS

"Non-Final Office Action", U.S. Appl. No. 12/917,196, (Nov. 5, 2012), 24 pages.
"Non-Final Office Action", U.S. Appl. No. 12/952,754, (Sep. 12, 2012), 11 pages.
"Non-Final Office Action", U.S. Appl. No. 12/958,173, (Dec. 19, 2012), 10 pages.
"Non-Final Office Action", U.S. Appl. No. 12/958,773, (Jul. 27, 2012), 18 pages.
"PCT Search Report and Written Opinion", Application No. PCT/US2011/052782, (Mar. 27, 2012), 11 pages.
"PCT Search Report and Written Opinion", Application No. PCT/US2011/061731, (May 10, 2012), 9 pages.
"PDA Phone Smartcard-reader combines Contact and Contactless technology & transfer data via GPRS", *Fifth Media Sdn. Bhd.*, Available at <http://www.fifthmedia.biz/NFC07.pdf>,(2009), 2 pages.
"Proximity Mobile Payments: Leveraging NFC and the Contactless Financial Payments Infrastructure", *Smart Card Alliance White Paper*, Available at <http://www.smartcardalliance.org/resources/lib/Proximity_Mobile_Payments_200709.pdf>,(Sep. 2007), 39 pages.
"Publishing Your Applications", Retrieved from: <http://developer.android.com/guide/publishing/publishing.html>on Sep. 6, 2010, (Aug. 23, 2010), 4 pages.
"Restriction Requirement", U.S. Appl. No. 12/958,773, (Jun. 7, 2012), 6 pages.
"Roamware's Macalla Platform", *Roamware, Inc.*, Available at <http://www.mobilemoneyexchange.org/Files/242ee787>,(Nov. 2009), 2 pages.
"Security Issues in the Context of Authentication Using Mobile Devices (Mobile eID)", available at <http://www.enisa.europa.eu/act/it/eid/mobile-eid/at_download/fullReport>, (Nov. 2008), 24 pages.
"Simfonie Mobile Payments", *GFG Group*, Available at <http://www.gfg-group.com/downloads/gfg_simfonie_product_brochure.pdf>,(2010), 4 pages.
"Smart Cards (Flexible Display)", Retrieved from: <http://www.citala.com/index.php/Application-Solutions/Smart-Cards.html>on Oct. 22, 2010, 2 pages.
"The Bump App for iPhone and Android", Retrieved from: <http://bu.mp/> on Oct. 28, 2010, Bump Technologies, Inc.,(2010), 1 page.
"The Mobile Wallet", *Quirk eMarketing, Mobile Marketing 101, Chapter 9*, Available at <http://www.quirk.biz/cms/3259.quirk_emarketing_mobile_marketing101_ch9.pdf>,(Oct. 19, 2010), pp. 1-10.
"Transfer pricing", Retrieved from: <http://www.deloitte.com/view/en_NZ/nz/services/tax-services/transfer-pricing/> on Oct. 12, 2010, (2010), 2 pages.
"ViVOtech Launches ViVOpay 8100—A Cost Effective PCI 2.1-Certified PIN pad, Mobile Loyalty, Mag-Stripe & NFC Payment Device for Small and Medium Sized Merchants", Retrieved from: <http://www.smartcardalliance.org/articles/2010/04/13/vivotech-launches-vivopay-8100-a-cost-effective-pci-2-1-certified-pin-pad-mobile-loyalty-mag-stripe-nfc-payment-device-for-small-and-medium-sized-merchants> on Oct. 20, 2010, (Apr. 13, 2010), 2 pages.
"Zinio Introduces International Pricing Management System for Publishers and their Global Licensees", Retrieved from: <http://in.zinio.com/press/press-release.jsp?pressreleaseid=pr148100> on Oct. 12, 2010, (Sep. 17, 2010), 2 pages.
Alvarez, Mark "Apple's iKey Will Put Your House Keys on Your Phone", Retrieved from: <http://www.atelier-us.com/mobile-wireless/article/apples-ikey-will-put-your-house-keys-on-your-phone> on Oct. 19, 2010, (Mar. 9, 2010), 2 pages.
Benson, Carol C., "Wallets and Stickers and Phones, Oh My!—A Look at Blaze Mobile", Retrieved from: <http://paymentsviews.com/2009/07/15/blaze-mobile/> on Aug. 27, 2010, (Jul. 15, 2009), 7 pages.
Billich, Christopher "The insider's Guide to Mobile Web Marketing in Japan", Retrieved from: <http://mobithinking.com/quide-mobile-Web-Japan> on Aug. 27, 2010, (2010), 6 pages.
Clark, Sarah "Canadian mobile operators 'plan to introduce NFC or contactless handsets within the year", Retrieved from: <http://www.nearfieldcommunicationsworld.com/2010/02/17/32839/canadian-mobile-operators-plan-to-introduce-nfc-or-contactless-handsets-within-the-year/> on Oct. 19, 2010, (Feb. 17, 2010), 3 pages.
Clark, Sarah "Orange and Valeo demonstrate NFC car key concept", Retrieved from: <http://www.nearfieldcommunicationsworld.com/2010/10/07/34592/orange-and-valeo-demonstrate-nfc-car-key-concept/> on Oct. 19, 2010, (Oct. 7, 2010), 1 page.
Conneally, Tim "Windows Phone Marketplace to include private app distribution, shareware models", Retrieved from: <http://www.betanews.com/article/Windows-Phone-Marketplace-to-include-private-app-distribution-shareware-modes/1276026026> on Sep. 6, 2010 (Jun. 8, 2010), 1 page.
Cooke, John "Flexible display in your smart card anyone?", Retrieved from: <http://www.cocatalyst.com/blog/index.php/2008/06/28/flexible-display-in-your-smart-card-anyone/> on Oct. 22, 2010, (Jun. 28, 2008), 4 pages.
Davies, Chris "MasterCard trialling smart credit cards with display & keypads", Retrieved from: <http://gigaom.com/2010/08/20/visa-testing-nfc-memory-cards-for-wireless-payments/> on Oct. 22, 2010, (Aug. 20, 2008), 12 pages.
Dixon, Matt "Future iPhoneto Unlock doors", Retrieved from: <http://top10.com/mobilephones/news/2010/03/iphone_to_unlock_doors/> on Oct. 19, 2010, (Mar. 10, 2010), 3 pages.
Gu, Huanyu et al., "Car Key ", Retrieved from: <http://www.autofocusasia.com/electrical_electronics/car_key_tody.htm> on Oct. 19, 2010, (2008), 5 pages.
Hardawar, Devindra "Verizon bets $400K on mobile loyalty card startup CardStar", Retrieved from: <http://www.reuters.com/article/idUS388514646320100821> on Oct. 20, 2010 (Aug. 21, 2010), 3 pages.
Kats, Rimma "Mobile Spinach introduces mobile coupons that never expire", Retrieved from: <http://www.mobilecommercedaily.com/mobile-spinach-introduces-mobile-coupons-that-do-not-expire/> on Oct. 20, 2010, (Jun. 8, 2010), 2 pages.
Kaviani, Nima et al., "A Two-factor Authentication Mechanism Using Mobile Phones", available at <http://lersse-dl.ece.ubc.ca/record/163/files/163.pdf>, Laboratory for Education and Research in Secure Systems Engineering, University of British Columbia, Technical report LERSSE-TR-2008-03,(Aug. 20, 2008), 27 pages.
Klenk, Andreas et al., "Preventing Identity Theft with available at Electronic Identity Cards and the Trusted Platform Module", available at <http://www.net.in.tum.de/fileadmin/bibtex/publications/papers/klenk_eurosec2009.pdf>, (Mar. 2009), 8 pages.
Lopez-De-Ipina, Diego et al., "Touch Computing: Simplifying Human to Environment Interaction through NFC Technology", *Faculty of Engineering (ESIDE), University of Duesto*, Available at <http://paginaspersonales.deusto.es/dipina/publications/dipinaJornadasRFID-NFC.pdf>,(Nov. 2007), 12 pages.
Maguire, Adam "Deal paves way for customer loyalty schemes", Retrieved from: <http://www.irishtimes.com/newspaper/finance/2010/0813/1224276713080.html> on Oct. 20, 2010 (Aug. 13, 2010), 6 pages.
McCarthy, Barry "The Risks and Opportunities in a Mobile Commerce Economy", *A First Data White Paper*, Available at <http://www.star-systems.com/downloads/thought-leadership/fd_mobilecommerceoverview_whitepaper.pdf>,(2008), 13 pages.
Okoegwale, Emmanuel "Mobile Money Service Provider Profiles",Retrieved from: <http://www.developingtelecoms.com/mobile-money-service-provider-profiles.html> on Oct. 19, 2010 (Jun. 25, 2009), 5 pages.
Olsen, Richard "Pricing in the FX Marketplace © ", *Olsen Ltd.*, Available at <http://mediaserver.fxstreet.com/Reports/ec6a8d2d-bbb6-412f-90f7-8a91ce0716f7/0a1df9c0-187f-4151-9785-5ef8ff4467cd.pdf>,(May 21, 2010), pp. 1-8.
Shankar, Venkatesh et al., "Mobile Marketing in the Retailing Environment: Current Insights and Future Research Avenues", *The*

(56) References Cited

OTHER PUBLICATIONS

*Journal of Interactive Marketing—Draft*, available at <http://www.crito.uci.edu/papers/2010/MobileMarketing.pdf>,(Feb. 2010), pp. 1-29.

Whitney, Lance "Apple files patent for Passbook coupons with a touch of NFC", downloaded at >>http://news.cnet.com/8301-13579_3-57560263-37/apple-files-patent-for-passbook-coupons-with-a-touch-of-nfc/<< on Dec. 21, 2012, (Dec. 20, 2012), 2 pages.

Wray, Jeffrey A., "Mobile Advertising Engine", *A Senior Research Paper, Stetson University, Spring Term 2009*, available at <http://www2.stetson.edu/mathcs/people/students/research/pdf/2008/jwray/final.pdf>,(2009), 52 pages.

Ziegler, Chris "Windows Phone Marketplace for Windows Phone 7 Series unveiled", Retrieved from: <http://www.endadget.com/2010/03/15/windows-phone-marketplace-for-windows-phone-7-series-unveiled/> on Sep. 6, 2010. (Mar. 15, 2010), 3 pages.

"Foreign Office Action", CN Application No. 201110310747.3, Jan. 8, 2014, 12 Pages.

"Foreign Office Action", CN Application No. 201110415260.1, Feb. 11, 2014, 17 Pages.

"Final Office Action", U.S. Appl. No. 12/899,861, Feb. 14, 2014, 30 pages.

"Final Office Action", U.S. Appl. No. 12/917,178, Feb. 11, 2014, 45 pages.

"Notice of Allowance", U.S. Appl. No. 12/952,754, Feb. 20, 2014, 8 pages.

"Final Office Action", U.S. Appl. No. 12/898,131, (Apr. 12, 2013), 31 pages.

"Final Office Action", U.S. Appl. No. 12/899,861, (May 10, 2013), 27 pages.

"Final Office Action", U.S. Appl. No. 12/917,196, (May 15, 2013), 31 pages.

"Final Office Action", U.S. Appl. No. 12/958,173, (Jun. 4, 2013), 15 pages.

"Final Office Action", U.S. Appl. No. 12/958,841, (May 24, 2013), 24 pages.

"My Starbucks Rewards—Examiners Digital Loyalty Reward Account Summary", Retrieved from <http://www.starbucks.com/account/rewards> on Apr. 24, 2013, (Apr. 24, 2013), 1 page.

"My Starbucks Rewards", Retrieved from <http://web.archive.org/web/20101130202420/https://www.starbucks.com/card/rewards> on May 24, 2013, (Nov. 30, 2010), 11 pages.

"Non-Final Office Action", U.S. Appl. No. 12/959,715, (Apr. 1, 2013), 19 pages.

"Foreign Office Action", CN Application No. 201110340395.6, Jul. 8, 2014, 11 pages.

"Foreign Office Action", CN Application No. 201110358418.6, Apr. 15, 2014, 12 Pages.

"Foreign Office Action", CN Application No. 201110415296.X, Jun. 27, 2014, 12 pages.

"Foreign Office Action", CN Application No. 201110415281.3, Jan. 17, 2014, 15 pages.

"Foreign Office Action", AU Application No. 2011312591, Jun. 16, 2014, 4 pages.

"Foreign Office Action", CN Application No. 201110317879.9, Jan. 6, 2014, 7 pages.

"Foreign Office Action", CN Application No. 201110392619.8, Nov. 5, 2013, 12 Pages.

"Foreign Office Action", CN Application No. 201110314187.9, Dec. 19, 2013, 13 pages.

"Foreign Office Action", CN Application No. 201110340395.6, Nov. 22, 2013, 15 Pages.

"Non-Final Office Action", U.S. Appl. No. 12/958,841, Nov. 7, 2013, 25 pages.

"Ex Parte Quayle Action", U.S. Appl. No. 12/958,173, Jan. 3, 2014, 4 pages.

"Final Office Action", U.S. Appl. No. 12/952,754, Dec. 13, 2013, 8 pages.

"Final Office Action", U.S. Appl. No. 12/958,173, Oct. 15, 2014, 7 pages.

"Final Office Action", U.S. Appl. No. 12/958,773, Dec. 29, 2014, 18 pages.

"Foreign Notice of Allowance", CN Application No. 201110415281.3, Aug. 27, 2014, 4 pages.

"Foreign Office Action", AU Application No. 2011312591, Sep. 19, 2014, 5 pages.

"Foreign Office Action", CN Application No. 201110310747.3, Sep. 15, 2014, 9 Pages.

"Foreign Office Action", CN Application No. 201110314187.9, Aug. 26, 2014, 15 Pages.

"Foreign Office Action", CN Application No. 201110317879.9, Aug. 29, 2014, 7 Pages.

"Foreign Office Action", CN Application No. 201110392619.8, Nov. 27, 2014, 6 Pages.

"Foreign Office Action", CN Application No. 201110409174.X, Aug. 4, 2014, 12 pages.

"Foreign Office Action", CN Application No. 201110415260.1, Dec. 3, 2014, 10 Pages.

"Foreign Office Action", CN Application No. 201110415260.1, Sep. 2, 2014, 15 pages.

"Identification cards—Physical Characteristics", ISO/IEC FCD 7810, Jun. 13, 2002, 16 pages.

"Near field communication", Retrieved from <http://en.wikipedia.org/wiki/Near_field_communication> on Oct. 8, 2014, Oct. 8, 2014, 16 pages.

"Non-Final Office Action", U.S. Appl. No. 12/917,178, Dec. 23, 2014, 47 pages.

"Non-Final Office Action", U.S. Appl. No. 12/917,196, Dec. 26, 2014, 31 pages.

"Non-Final Office Action", U.S. Appl. No. 12/958,841, Aug. 28, 2014, 30 pages.

"Notice of Allowance", U.S. Appl. No. 14/296,334, Sep. 15, 2014, 6 pages.

"Notice of Allowance", U.S. Appl. No. 14/296,334, Dec. 31, 2014, 6 pages.

"Top 10 reasons why you should be a part of My Starbucks Rewards", Jul. 18, 2010, 3 pages.

Negishi, "Long before Apple Pay, Japan had "Mobile Wallet"", retrieved from <http://blogs.wsj.com/japanrealtime/2014/09/11/long-before-apple-pay-japan-had-mobile-wallet/> on Dec. 8, 2014, Sep. 11, 2014, 5 pages.

Zhou, "Transportation Card Enter Into Campus Management of Consumption", YINDA Electronic Engineering Company, (Golden Card Project) Issue 8, p. 32-33, Aug. 31, 2001, 3 pages.

"Final Office Action", U.S. Appl. No. 12/917,178, (Mar. 26, 2013), 37 pages.

"Non-Final Office Action", U.S. Appl. No. 12/898,131, (Jan. 4, 2013), 25 pages.

"Non-Final Office Action", U.S. Appl. No. 12/898,131, (Feb. 14, 2013), 24 pages.

"Non-Final Office Action", U.S. Appl. No. 12/899,861, (Jan. 7, 2013), 22 pages.

"Non-Final Office Action", U.S. Appl. No. 12/958,841, (Jan. 9, 2013), 24 pages.

"Starbucks Card Mobile App", Retrieved from <http://web.archive.org/web/20100303042234/http://www.starbucks.com/coffeehouse/mobileapps/starbucks-card-mobile> on Dec. 19, 2012, (Mar. 2, 2010), 9 pages.

Nash, Kim S., "Follow the Money", *Nash, Kim S., Follow the Money, Dec. 1, 2009, pp. 26-32*, (Dec. 1, 2009), 6 pages.

"baiMobile Framework for Secure Credentials for iOS and Android", Biometric Associates, LP—Retrieved at: https://www.biometricassociates.com/smart-card-framework/ on Jun. 15, 2015, 3 pages.

"baiMobile® 3000 MP Bluetooth Smart Card Reader", Biometric Associates, LP—Retrieved at: https://www.biometricassociates.com/products/smart-card-readers/3000mp-reader/ on Jun. 15, 2015, 4 pages.

"Contactless Mobile Payment Architecture Overview", Version 1.0—EMVCo Contactless Mobile Payment, Jun. 2010, 28 Pages.

"DoD Common Access Card (CAC)", Retrieved at: http://www.cac.mil/common-access-card/ on Jun. 15, 2015, 3 pages.

(56) References Cited

OTHER PUBLICATIONS

"DoD Implementation Guide for CAC PIV End-Point", Card Technologies & Identity Solutions Division (CTIS)—Retrieved at: http://www.cac.mil/docs/refl.c.i-CAC_EndPoint_Implementation_Guide_v1-22.pdf, Jul. 10, 2008, 47 pages.
"EMV Mobile Contactless Payment—Technical Issues and Position Paper", Version 1.0, Oct. 2007, 37 pages.
"EMVCo Handset Requirements for Contactless Mobile Payment", EMV Contactless Mobile Payment—Version 1.0, Jun. 2010, 20 pages.
"Foreign Notice of Allowance", CN Application No. 201110392619.8, May 6, 2015, 4 Pages.
"Foreign Office Action", CN Application No. 201110310747.3, Mar. 26, 2015, 10 pages.
"Foreign Office Action", CN Application No. 201110358418.6, Jul. 3, 2015, 8 Pages.
"Foreign Office Action", CN Application No. 201110409174.X, Apr. 27, 2015, 8 Pages.
"Foreign Office Action", CN Application No. 201110415296.X, Jun. 15, 2015, 8 Pages.
"iPad & iPhone PKard® Reader Bundles", Retrieved at: http://www.thursby.com/products/pkard-reader on Jun. 15, 2015, 5 pages.
"Mobile Phone Work Group—Selected Use Case Analyses v1.0", Trusted Computing Group—Retrieved at: www.trustedcomputinggroup.org/files/resource_files/878E30CD-1D09-3519-ADD093FFF2027E2B/Selected_Use_Case_Analyses_v1.0_Executive_Summary.pdf, 2009, 1 page.
"Smart ID Systems", Retrieved at: https://web.archive.org/web/20090704081836/http:/www.biometricassociates.com/ on Jun. 15, 2015, Jul. 4, 2009, 1 page.
"TCG Mobile Reference Architecture—Specification version 1.0", Revision 1—Retrieved at: www.trustedcomputinggroup.org/files/temp/644597BE-1D09-3519-AD5ADDAFA0B539D2/MPWG%20tcg-mobile-reference-architecture-1.pdf, Jun. 12, 2007, 87 pages.
"The BAL Authenticator Smart Card", Biometric Associates, LP—Retrieved at: https://web.archive.org/web/20090718213643/http:/www.biometricassociates.com/smartcard.php on Jun. 15, 2015, Jul. 18, 2009, 2 pages.
"Thursby Software: ADmitMac for CAC—A secure integration of DOD CAC for Macintosh", Retrieved at: https://web.archive.org/web/20090217222710/http:/www.thursby.com/products/afc.html on Jun. 15, 2015, Feb. 17, 2009, 2 pages.
"Trusted Platform Modules Strengthen User and Platform Authenticity", Trusted Computing Group—Retrieved at: www.trustedcomputinggroup.org/files/resource_files/8D46621F-1D09-3519-ADB205692DBBE135/Whitepaper_TPMs_Strengthen_User_and_Plafform_Authenticity_Final_1_0.pdf, Jan. 2005, 8 pages.
"U.S. Department of Defense Common Access Card", Smart Card Alliance—Retrieved at: www.smartcardalliance.org/resources/lib/DoD_CAC_Profile.pdf, 2005, 2 pages.
Ardiley,"History of the Common Access Card (CAC)", Retrieved at: http://www.securityinfowatch.com/article/10653434/history-of-the-common-access-card-cac, Mar. 19, 2012, 4 pages.
Response filed Oct. 26, 2015 to Office Action mailed Jul. 10, 2015 from China Patent Application No. 0201110340395.6, 12 pages.
Response filed Apr. 30, 2013 to the Non-Final Office Action mailed Apr. 1, 2013 from U.S. Appl. No. 12/959,715, 15 pages.
Response filed Oct. 15, 2013 to the Final Office Action mailed Aug. 28, 2013 from U.S. Appl. No. 12/959,715, 17 pages.
Response filed Oct. 7, 2014 to the Non-Final Office Action mailed Jul. 7, 2014 from U.S. Appl. No. 12/959,715, 15 pages.
Response filed Jun. 1, 2015 to the Final Office Action mailed Jan. 30, 2015 from U.S. Appl. No. 12/959,715, 20 pages.
Supplemental Amendment filed Jul. 14, 2015 to the Final Office Action mailed Jan. 30, 2015 from U.S. Appl. No. 12/959,715, 21 pages.
Non-Final Office Action mailed Jan. 4, 2016 from U.S. Appl. No. 12/959,715, 52 pages.
Amendment/Response filed Apr. 4, 2016 to the Non-Final Office Action mailed Jan. 4, 2016 from U.S. Appl. No. 12/959,715, 16 pages.
Response filed Feb. 13, 2013 to the Non-Final Office Action mailed Jan. 7, 2013 from U.S. Appl. No. 12/899,861, 11 pages.
Response filed Jul. 18, 2013 to the Final Office Action mailed May 10, 2013 from U.S. Appl. No. 12/899,861, 15 pages.
Response filed Nov. 11, 2013 to the Non-Final Office Action mailed Aug. 15, 2013 from U.S. Appl. No. 12/899,861, 17 pages.
International Preliminary Report on Patentability mailed Apr. 9, 2013 from PCT Patent Application No. PCT/US2011/052782, 6 pages.
Supplementary European Search Report mailed Mar. 31, 2016 from European Patent Application No. 11831212.3, 4 pages.
Response filed Mar. 1, 2013 to the Non-Final Office Action mailed Jan. 4, 2013 from U.S. Appl. No. 12/898,131, 14 pages.
Response filed Jun. 11, 2013 to the Final Office Action mailed Apr. 12, 2013 from U.S. Appl. No. 12/898,131, 15 pages.
Response filed Feb. 18, 2013 to the Non-Final Office Action mailed Nov. 5, 2012 from U.S. Appl. No. 12/917,196, 11 pages.
U.S. Appl. No. 61/390,590 titled "Global Pricing for Content Distribution," filed on Oct. 6, 2010 by Inventors Rao, Mihir and Kamran Rajabi Zargahi, 46 pages.
Response filed May 7, 2014 to the First Office Action mailed Jan. 6, 2014 from China Application No. 201110317879.9, 16 pages.
Response filed Nov. 12, 2014 to the Second Office Action mailed Aug. 29, 2014 from China Application No. 201110317879.9, 4 pages.
Response filed May 23, 2016 to the Fourth Office Action mailed Apr. 6, 2016 from China Patent Application No. 201110409174.X, 8 pages.
Response filed Sep. 16, 2013 to the Final Office Action mailed May 15, 2013 from U.S. Appl. No. 121917,196, 14 pages.
Response filed Dec. 12, 2012 to the Non-Final Office Action mailed Sep. 12, 2012 from U.S. Appl. No. 12/917,178, 16 pages.
Response filed Jun. 26, 2013 to the Final Office Action mailed Mar. 26, 2013 from U.S. Appl. No. 121917,178, 15 pages.
Response filed Oct. 25, 2013 to the Non-Final Office Action mailed Jul. 25, 2013 from U.S. Appl. No. 12/917,178, 19 pages.
Response filed Apr. 16, 2014 to the Final Office Action mailed Feb. 11, 2014 from U.S. Appl. No. 12/917,178, 18 pages.
Response filed Aug. 29, 2014 to the Non-Final Office Action mailed May 29, 2014 from U.S. Appl. No. 12/917,178, 20 pages.
Response filed Jun. 3, 2014 to the First Office Action mailed Jan. 17, 2014 from China Patent Application No. 201110415281.3, 38 pages.
Response filed Apr. 8, 2014 to the First Office Action mailed Nov. 22, 2013 from China Patent Application No. 201110340395.6, 11 pages.
Response filed Sep. 23, 2014 to the Second Office Action mailed Jul. 8, 2014 from China Patent Application No. 201110340395.6, 11 pages.
Response filed Mar. 27, 2015 to the Third Office Action mailed Jan. 12, 2015 from China Patent Application No. 201110340395.6, 11 pages.
Decision on Rejection mailed Jul. 10, 2015 from China Patent Application No. 201110340395.6, 11 pages.
Response filed Mar. 19, 2013 to the Non-Final Office Action mailed Dec. 19, 2012 from U.S. Appl. No. 12/958,173, 7 pages.
Response filed Aug. 2, 2013 to the Final Office Action mailed Jun. 4, 2013 from U.S. Appl. No. 12/958,173, 16 pages.
Response filed Sep. 23, 2013 to the Ex Parte Quayle Action mailed Aug. 29, 2013 from U.S. Appl. No. 12/958,173, 11 pages.
Response filed Jan. 20, 2014 to the Ex Parte Quayle Action mailed Jan. 3, 2014 from U.S. Appl. No. 12/958,173, 10 pages.
Response filed Jul. 15, 2014 to the Non-Final Office Action mailed Apr. 23, 2014 from U.S. Appl. No. 12/958,173, 16 pages.
Applicant Initiated Interview Summary mailed Dec. 19, 2014 from U.S. Appl. No. 12/958,173, 3 pages.
First Office Action and Search Report mailed Aug. 4, 2014 from China Patent Application No. 201110409174.X, 12 pages.

(56) References Cited

OTHER PUBLICATIONS

Response filed Dec. 19, 2014 to the First Office Action and Search Report mailed Aug. 4, 2014 from China Patent Application No. 201110409174.X, 15 pages.
Second Office Action mailed Apr. 27, 2015 from China Patent Application No. 201110409174.X, 7 pages.
Response filed Jun. 29, 2015 to the Second Office Action mailed Apr. 27, 2015 from China Patent Application No. 201110409174.X, 8 pages.
Third Office Action mailed Nov. 4, 2015 from China Patent Application No. 201110409174.X, 7 pages.
Response filed Nov. 30, 2015 to the Third Office Action mailed Nov. 4, 2015 from China Patent Application No. 201110409174.X, 15 pages.
Fourth Office Action mailed Apr. 6, 2016 from China Patent Application No. 201110409174.X, 8 pages.
Response filed May 21, 2014 to the First Office Action mailed Jan. 8, 2014 from China Patent Application No. 201110310747.3, 12 pages.
Response filed Nov. 25, 2014, 2014 to the Second Office Action mailed Sep. 15, 2014 from China Patent Application No. 201110310747.3, 13 pages.
Response filed May 5, 2014 to the First Office Action mailed Dec. 19, 2013 from China Patent Application No. 201110314187.9, 18 pages.
Response filed Mar. 18, 2014 to the First Office Action mailed Nov. 5, 2013 from China Patent Application No. 201110392619.8, 10 pages.
Response filed Jul. 23, 2014 to the Second Office Action mailed May 14, 2014 from China Patent Application No. 201110392619.8, 10 pages.
Response filed Jan. 29, 2015 to the Third Office Action mailed Nov. 27, 2014 from China Patent Application No. 201110392619.8, 10 pages.
Response filed Feb. 16, 2015 to the Final Office Action mailed Oct. 15, 2014 from U.S. Appl. No. 12/958,173, 19 pages.
Non-Final Office Action mailed Oct. 23, 2015 from U.S. Appl. No. 121/958,173, 39 pages.
Response and Interview Request filed Nov. 8, 2015 to the Non-Final Office Action mailed Oct. 23, 2015 from U.S. Appl. No. 12/958,173, 8 pages.
Final Office Action mailed Feb. 17, 2016 from U.S. Appl. No. 12/958,173, 13 pages.
Response filed Oct. 17, 2012 to the Non-Final Office Action mailed Sep. 12, 2012 from U.S. Appl. No. 12/952,754, 16 pages.
Applicant Initiated Interview Summary mailed Oct. 23, 2012 from U.S. Appl. No. 12/952,754, 3 pages.
Response filed Feb. 14, 2013 to the Final Office Action mailed Dec. 6, 2012 from U.S. Appl. No. 12/952,754, 17 pages.
Response filed Oct. 14, 2013 to the Non-Final Office Action mailed Jul. 15, 2013 from U.S. Appl. No. 12/952,754, 21 pages.
Response filed Feb. 10, 2014 to the Final Office Action mailed Dec. 13, 2013 from U.S. Appl. No. 12/952,754, 10 pages.
Preliminary Amendment filed Sep. 2, 2014 from U.S. Appl. No. 14/296,334, 10 pages.
Examiner Initiated Interview Summary mailed Sep. 15, 2014 from U.S. Appl. No. 14/296,334, 1 page.
Response filed Jul. 2, 2012 to the Restriction Requirement Election mailed Jun. 7, 2012 from U.S. Appl. No. 12/958,773, 8 pages.
Response filed Aug. 16, 2012 to the Non-Final Office Action mailed Jul. 27, 2012 from U.S. Appl. No. 12/958,773, 16 pages.
Response filed Oct. 1, 2012 to the Final Office Action mailed Aug. 29, 2012 from U.S. Appl. No. 121958,773, 18 pages.
Response filed Mar. 11, 2015 to the Final Office Action mailed Dec. 29, 2014 from U.S. Appl. No. 12/958,773, 19 pages.
Non-Final Office Action mailed Jan. 6, 2016 from U.S. Appl. No. 12/958,773, 24 pages.
Response filed Mar. 17, 2016 to the Non-Final Office Action mailed Jan. 6, 2016 from U.S. Appl. No. 12/958,773, 11 pages.
Response filed Aug. 22, 2014 to the First Examination Report mailed Jun. 16, 2014 from Australia Patent Application No. 2011312591, 26 pages.
Response filed Dec. 17, 2014 to the Second Examination Report mailed Sep. 19, 2014 from Australia Patent Application No. 2011312591, 3 pages.
International Preliminary Report on Patentability mailed Jun. 4, 2013 from PCT Patent Application No. PCT/US2011/061731, 5 pages.
Response filed Feb. 11, 2013 to the Non-Final Office Action mailed Jan. 9, 2013 from U.S. Appl. No. 12/958,841, 17 pages.
Response filed Aug. 20, 2013 to the Final Office Action mailed May 24, 2013 from U.S. Appl. No. 121958,841, 16 pages.
Response filed Feb. 6, 2014 to the Non-Final Office Action mailed Nov. 7, 2013 from U.S. Appl. No. 12/958,841, 18 pages.
Response filed Aug. 8, 2014 to the Final Office Action mailed May 8, 2014 from U.S. Appl. No. 12/958,841, 18 pages.
Response filed Jun. 24, 2014 to the First Office Action mailed Feb. 11, 2014 from China Patent Application No. 201110415260.01, 12 pages.
Response filed Nov. 17, 2014 to the Second Office Action mailed Sep. 2, 2014 from China Patent Application No. 201110415260.01, 13 pages.
Response filed Aug. 26, 2014 to the First Office Action mailed Apr. 15, 2014 from China Patent Application No. 201110358418.6, 11 pages.
Response filed Mar. 13, 2015 to the Second Office Action mailed Dec. 31, 2014 from China Patent Application No. 201110358418.6, 9 pages.
Response filed Nov. 12, 2014 to the First Office Action mailed Jun. 27, 2014 from China Patent Application No. 201110415296.X, 11 pages.
Response filed Mar. 12, 2015 to the Second Office Action mailed Jan. 5, 2015 from China Patent Application No. 201110415296.X, 9 pages.
Notice on Reexamination mailed Apr. 21, 2016 from China Patent Application No. 201110340395.6, 9 pages.
Response filed Jun. 6, 2016 to the Notice on Reexamination mailed Apr. 26, 2016 from China Patent Application No. 201110340395.6, 12 pages.
Final Office Action mailed Jun. 1, 2016 from U.S. Appl. No. 12/958,773, 18 pages.
Notice of Allowance mailed Jul. 15, 2016 from U.S. Appl. No. 12/959,715, 8 pages.
Applicant-Initiated Interview Summary mailed Aug. 19, 2016 from U.S. Appl. No. 12/958,773, 3 pages.
Decision on Rejection mailed Oct. 8, 2016 from China Patent Application No. 201110409174.X, 7 pages.
Notice on Reexamination mailed Sep. 29, 2016 from Chinese Patent Application No. 201110340395.6, 10 pages.

\* cited by examiner

PROVISIONING TECHNIQUES

BACKGROUND

Mobile communication devices such as wireless phones have become a common part in the everyday life of a wide variety of users. Consequently, the mobile communication device may serve as a primary point of contact for a variety of business and personal uses. For example, a business user may utilize the mobile communication device to receive email, a casual user may send text messages to friends, either one of the users may share pictures, and so on.

However, traditional techniques that were employed to securely store data on the mobile communication device as well as to communicate data to the mobile communication device could result in the data being "in the clear." Even if but for a brief moment in time, malicious parties may take advantage of this vulnerability to steal sensitive data. This may even result in the ability by the malicious party to access other information on the mobile communication device itself. Consequently, functionality of the mobile communication device may be limited from meeting its true potential due to the ability to compromise data on the mobile communication device.

SUMMARY

Provisioning techniques are described. In implementations, a particular one of a plurality of public keys are located using an identifier included in a request received via a network. The located public key is communicated via the network, the public key configured to encrypt data that is to be decrypted by a secure element of a mobile communication device, the secure element implemented using hardware and including a private key that is configured to decrypt the data that was encrypted using the public key.

In implementations, a request including an identifier of a secure element implemented in hardware of the mobile communication device is transmitted. A response to the request is received that includes data that is encrypted using a public key that corresponds to the private key. The data is decrypted by the secure element using the private key and functionality of the mobile communication device is provisioned using the data.

In implementations, a mobile communication device comprises a secure element implemented in hardware that is configured to decrypt credentials using a private key included in the secure element and store the credentials once decrypted in the secure element, the credentials configured to secure communications with the mobile communication device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Mobile communication devices (e.g., wireless phones) are configured to provide a wide variety of functionality. However, data may be compromised on the mobile communication devices using traditional techniques. Therefore, the mobile communication device may not realize its true potential.

Provisioning service techniques are described. In implementations, a provisioning service is described to enable secure communications with a mobile communication device, both by the provisioning service itself as well as with third party services. For example, asymmetric encryption techniques may be employed (e.g., using public/private key pairs) in which the provisioning service stores a public key, while the corresponding private key is implemented in hardware on the mobile communication device. The provisioning service may then provide the public key to other services (e.g., third party services) in order to secure communications with the mobile communication device. In this way, the other services may communicate data (e.g., credentials, other cryptographic keys, and other information) without the data being exposed "in the clear" as was encountered using traditional techniques.

Additionally, the provisioning service may be employed as an intermediary to communicate between the service and the mobile communication device without knowing what is being communicated. In implementations, this feature is auditable such that the security of the data may be verified by other entities. Further discussion of the provisioning techniques may be found in relation to the following sections.

In the following discussion, a variety of example implementations of a mobile communication device (e.g., a wireless phone) are described. Additionally, a variety of different functionality that may be employed by the mobile communication device is described for each example, which may be implemented in that example as well as in other described examples. Accordingly, example implementations are illustrated of a few of a variety of contemplated implementations. Further, although a mobile communication device having one or more modules that are configured to provide telephonic functionality are described, a variety of other mobile devices are also contemplated, such as personal digital assistants, mobile music players, dedicated messaging devices, portable game devices, netbooks, and so on.

Example Implementations

Figure 1:
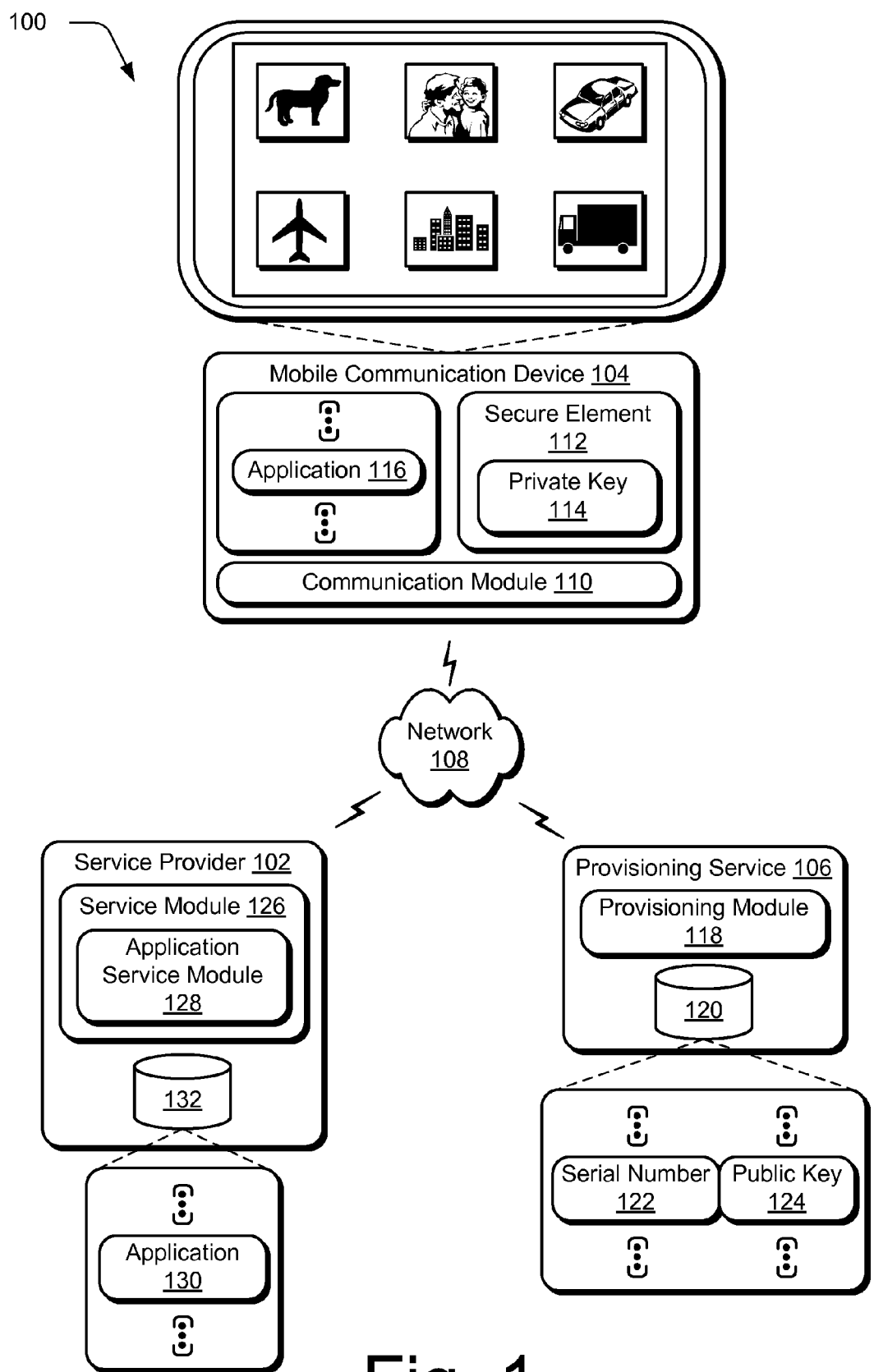
FIG. 1 is an illustration of an example implementation of a mobile communication device in accordance with one or more embodiments of devices, features, and systems for mobile communications.

FIG. 1 is an illustration of an example implementation of an environment 100 that is operable to employ the techniques described herein. The environment includes a service provider 102, a mobile communication device 104, and a provisioning service 106 that are illustrated as communicatively coupled, one to another, via a network 108. Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be representative of multiple networks.

The mobile communication device 102 is further illustrated as including a communication module 110. The communication module 110 is representative of functionality of the mobile communication device 102 to communicate via the network 108. For example, the communication module 110 may include telephone functionality to make and receive telephone calls, such as by employing a telephone module to communicate via a plain old telephone service (POTS), wireless network (e.g., cellular and/or Wi-Fi), and so on.

The communication module 110 may also include a variety of other functionality, such as to capture content, form short message service (SMS) text messages, multimedia messaging service (MMS) messages, emails, status updates to be communicated via a social network service or micro-blog, and so on. For instance, the communication module 110 may also support browser functionality to browse the network 108.

The mobile communication device 104 is further illustrated as including a secure element 112. In one or more implementations, the secure element 112 is representative of functionality to support secure communications with the mobile communication device 104. For example, the secure element 112 may be implemented using hardware and configured during manufacture to include a private key 114. For instance, the secure element 112 may be implemented using a tamper-resistant integrated circuit that is resistant to "snooping" as well as physical removal from the mobile communication device 104 by a manufacturer of the device. For example, the manufacturer may cover a surface-mounted integrated circuit with an epoxy that helps to prevent snooping of the circuit as well as causing the circuit to break if removal is attempted. Further, this manufacturing process may be auditable to ensure that the private key is kept secret.

In implementations, the secure element 112 includes functionality to perform encryption and/or decryption operations. For example, the secure element 112 may use the private key 114 to perform a decryption operation and expose a result of the operation to other functionality of the mobile communication device 104, such as to one or more applications 116 that are executable by the mobile communication device 104. In this example, the secure element 112 may receive data to be decrypted from the application 116, decrypt the data using the private key 114, and then expose a result of the decryption operation (i.e., the decrypted data) to the application 116. Therefore, inclusion of the private key 114 in the secure element 112 may help to protect the private key 114 from discovery "outside" the secure element 112 by keeping the private key 114 from being exposed "in the clear" during the decryption operation.

A variety of other functionality may also be supported through use of the secure element 112. For example, the secure element 112 may support a protected communication channel through the provisioning service 106. The provisioning service 106, for instance, may include a provisioning module 118 and storage 120. The storage 120 may be used to maintain a serial number 122 assigned to an integrated circuit that includes the secure element 112 and a corresponding public key 124 that forms an asymmetric public/private key pair with the private key 114 of the mobile communication device 104. The provisioning module 118 may thus provide the public key 124 to third-party services such that communication between the third-party service and the mobile communication device 104 is protected, even if that communication occurs using the provisioning service 106 or other service as an intermediary.

For example, a user of the mobile communication device 104 may interact with the communication module 110 or other functionality (e.g., an application 116) to navigate to a service provider 102 over the network 108. The service provider 102 as illustrated includes a service module 126 that is representative of functionality to provide one or more services for access via the network 108.

An example of one of these services is illustrated as implemented by an application service module 128. The application service module 128 is representative of functionality to manage dissemination of one or more applications 130 via the network 108. Although the applications 130 are illustrated as stored in storage 132 local to the service provider 102 (e.g., as part of a server farm that implements the service provider 102), the storage 132 may be representative of a wide variety of different types of storage, e.g., third party storage.

In an example, the application service module 138 manages a marketplace configured to provide applications 130 for purchase via the network 108. Therefore, a user of the mobile communication device 104 may access the marketplace to purchase one or more of the applications 130 for download to local storage, which is illustrated as application 116 in this example. To purchase and/or transport the application 130, the mobile communication device 104 and the service provider 102 may utilize secure communications implemented at least in part through use of the secure element 112. The secure communications may be implemented in a variety of ways.

In one instance, the public key 124 is provided to secure communications between the service provider 102 and the mobile communication device 104 directly. For example, the public key 124 may be located by the provisioning module 118 of the provisioning service 106 by obtaining a serial number 122 for the integrated circuit that implements the secure element 112, e.g., from the mobile communication device 104. The provisioning module 118 may then use the serial number 122 to locate the public key 124 and provide the public key 124 to the service provider 102. The public key 124 may then be used to encrypt data to be communicated to the mobile communication device 104, such as the application 130, billing information and other credentials, and so on.

In another instance, the provisioning service 106 provides the public key 124 to the service provider 102 as a basis to support indirect communications, such as to securely transport credentials and other data (e.g., cryptographic keys) that are to be used as a basis to form a communication channel. For example, the service provider 102 may provide credentials (e.g., other cryptographic keys) that are to be used to secure communications between the service provider 102 and the mobile communication device 104. To protect these credentials from compromise by malicious parties, the credentials may be encoded using this public key 124. In other words, the other cryptographic keys may be encrypted using the public key 124 for communication to the mobile communication device 104 to protect the other cryptographic keys from discovery by malicious parties.

In this way, regardless of whether the communication is communicated indirectly via the provisioning service 106 or directly via the network 108, the credentials (e.g., the other cryptographic keys) are protected from discovery through encryption using the public key 124. Therefore, even the provisioning service 106 itself is not able to determine "what" is being communicated between the service provider 102 and the mobile communication device 104.

The mobile communication device 104 may then decrypt the communication using the secure element 112, and more particularly the private key 114, to obtain the other cryptographic keys. A variety of different techniques may then be employed to utilize the other cryptographic keys once decrypted.

In one technique, the other cryptographic keys are exposed for use outside the secure element 112, such as by an application 116 or other functionality of the mobile communication device 104. Thus, in this techniques the secure element 112 is leveraged to provide the credentials that are used to serve as a basis to secure communications but is not used to secure the communications itself, i.e., to provide the actual encryption/decryption.

In another technique, the other cryptographic keys may be kept from being exposed outside the secure element 112 through storage within the secure element 112. The secure element 112 may then use the cryptographic keys as previously described to decrypt and/or encrypt data received by the secure element 112 without exposing the cryptographic keys "outside" the secure element 112. The secure element 112 may thus employ a variety of different techniques to secure communications with the mobile communication device 104, the example of the service provider 102 above being but one of many such examples.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the provisioning techniques described below are platform-independent, meaning that the techniques may be implemented on a variety of commercial computing platforms having a variety of processors.

Example Procedures

The following discussion describes techniques that may be implemented utilizing the previously described systems and devices. Aspects of each of the procedures may be implemented in hardware, firmware, software, or a combination thereof. The procedures are shown as a set of blocks and/or arrows that specify operations performed by one or more devices and/or data communicated between the devices and are not necessarily limited to the orders shown for performing the operations by the respective blocks or arrows. In portions of the following discussion, reference will be made to the environment 100 of FIG. 1.

Figure 2:
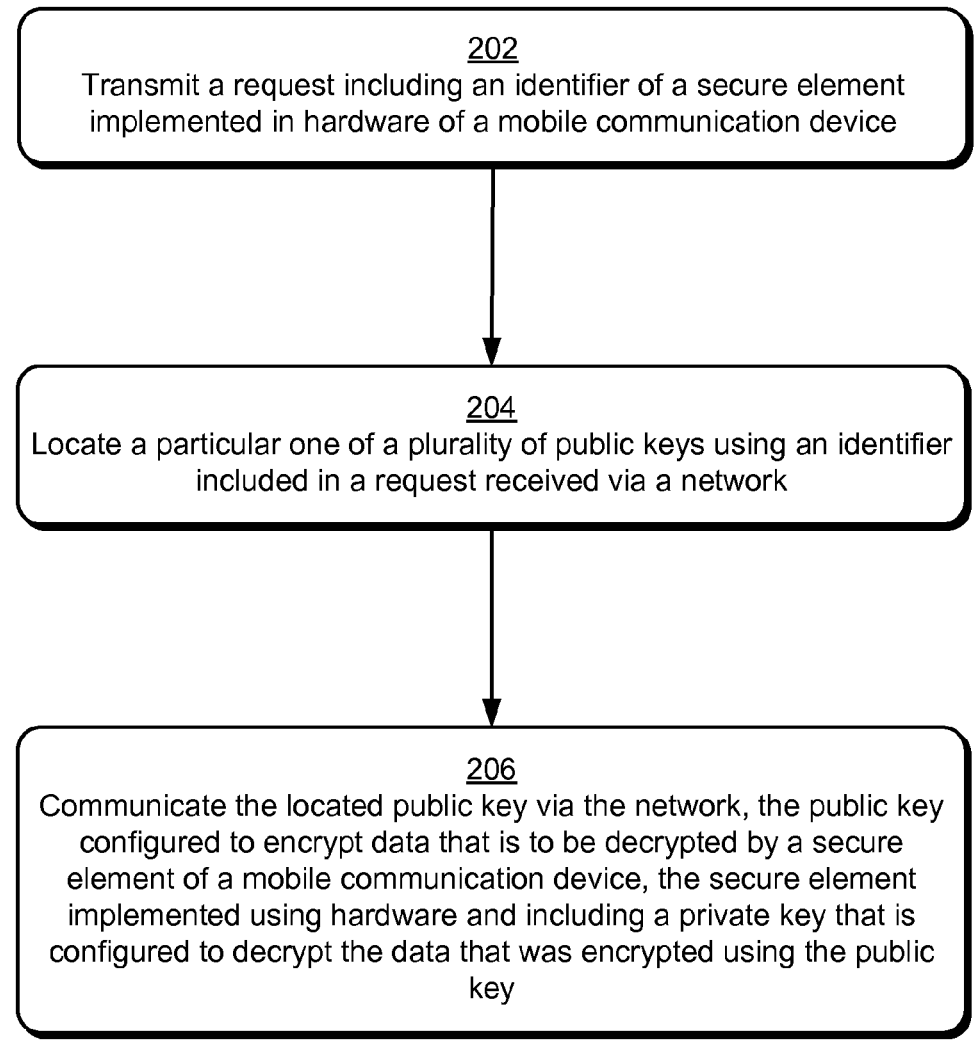
FIG. 2 is a flow diagram depicting a procedure in an example implementation in which a public key is located to communicate with a mobile communication device.

FIG. 2 depicts a procedure 200 in an example implementation in which a public key is located to communicate with a mobile communication device. A request is transmitted that includes an identifier of a secure element implemented in hardware of a mobile communication device (block 202). For example, the identifier may describe a serial number of an integrated circuit that implements the secure element 112 of the mobile communication device 104. The serial number 122, for instance, may be stored during manufacture of the mobile communication device 104 with a corresponding public key 124. As previously noted, the public key 124 may be part of a public/private key pair 124, 114 that uses asymmetric encryption.

The request may be transmitted by a variety of different entities, such as by a service provider 102 in order to communicate with the mobile communication device 104, by the mobile communication device 104, itself, to provision functionality, and other entities. For example, the service provider 102 may obtain the serial number 112 from the mobile communication device 104 and communicate it to the provisioning service 106 to secure communications between the service provider 102 and the mobile communication device 104. In another example, the mobile communication device 104 may receive a request from a user of the device to provision functionality of the mobile communication device 104, such as to enable execution of an application 116 by the device, provide a secure communication channel with another device (e.g., the service provider), and so on. A variety of other examples are also contemplated.

A particular one of a plurality of public keys is located using an identifier included in a request received via a network (block 204). Continuing with the previous example, the identifier (e.g., a serial number or other identifier) may be used by the provisioning service 106 to locate the public key 124. In this way, the provisioning service 106 may locate the public key 124 without engaging in an encryption or decryption operation itself. Further, the provisioning service 106 may be configured to be auditable by other entities to verify that the provisioning service 106 is not able to decrypt data to be sent to the mobile communication device 104 that is encrypted using the public key 124. And thus, the provisioning service 106 may be "trusted" by service provider 102, the mobile communication device 104, and other entities that are to communicate via the service.

The located public key is communicated via the network, the public key configured to encrypt data that is to be decrypted by a secure element of a mobile communication device, the secure element implemented using hardware and including a private key that is configured to decrypt the data that was encrypted using the public key (block 206). The secure element 112, for instance, may receive data encrypted by the public key 124 and decrypt the data using hardware functionality of the secure element 112 itself. In this way, the private key 114 as well as the data are protected from malicious parties. The secure element 112 may then expose the data or keep the data internal, further discussion of which may be found in relation to FIGS. 4 and 5.

Figure 3:
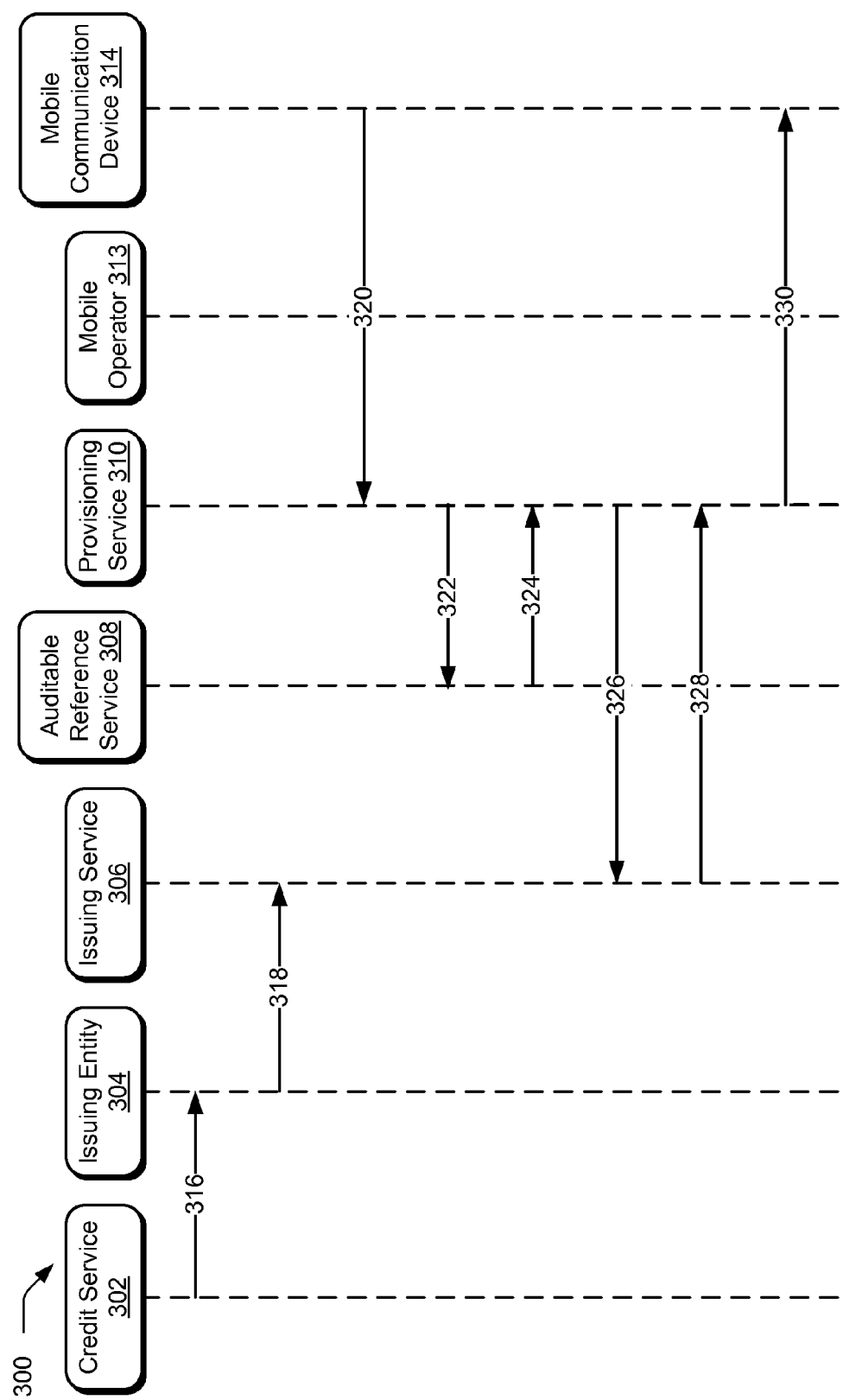
FIG. 3 is a chart depicting a procedure in an example implementation in which a technique to communicate data securely to a mobile communication device is shown

FIG. 3 depicts a procedure 300 in an example implementation in which a technique to communicate data securely to a mobile communication device is shown. The procedure 300 is illustrated as including a credit service 302, an issuing entity 304, (e.g., a bank or other financial institution), an issuing service 306 (e.g., Gemalto), an auditable reference service 308, a provisioning service 310 (which may or may not correspond to the provisioning service 106 of FIG. 1), a mobile operator (e.g., an operator of a wireless network), and a mobile communication device 314, which may or may not correspond to the mobile communication device 104 of FIG. 1. In the following discussion, the arrows will be used in indicate an example flow of data. It should be readily apparent however, that the order and the data referenced therein describe one of a variety of different implementations.

At arrow 316, data is communicated from the credit service 302 (e.g., a credit card service such as Visa) to an issuing entity 304, such as a bank or other financial institution that issues credit cards. At arrow 318, the issuing entity 304 communicates data to an issuing service 306 to issue one or more credit cards, e.g., to permit use of the credit cards for online payments and so on.

At arrow 320, a mobile communication device 314 makes a request to a provisioning service 310 to provision functionality of the mobile communication device 314. A wide variety of functionality may be provisioned, such as to enable execution of an application by the mobile communication device 314, to obtain credentials to access a web service, and so on.

At arrow 322, the provisioning service 310 communicates with an auditable reference service 308 to locate a public key that is associated with the mobile communication device 314. As stated in relation to FIG. 2, for instance, the request may include an identifier (e.g., a serial number) that is usable to locate a public key of mobile communication device 314. Further, the auditable reference service 308 may be configured to permit other entities to "check" the device to ensure that communication performed through the device or other devices are protected from discovery as previously described.

At arrow 324, the provisioning service 310 receives a response to the request of arrow 322 that includes the public key that corresponds to the mobile communication device 314. At arrow 326, the provisioning service 310 then provides this public key to the issuing service 306 along with a request for data (e.g., credentials) to be communicated to the mobile communication device 314. At arrow 328, the provisioning service 310 receives the data encrypted by the public key and at arrow 330 communicates the data to the mobile communication device 314.

Thus, in this example the provisioning service 310 acts as an intermediary to manage provisioning of the mobile communication device. Further, the "trustworthiness" of this function may be verified by outside entities through auditing of the auditable reference service 308. In this way, even if the auditable reference service 308 is compromised by a malicious party the integrity of data on the mobile communicates device 314 is maintained, further discussion of which may be found in relation to the following figures.

Figure 4:
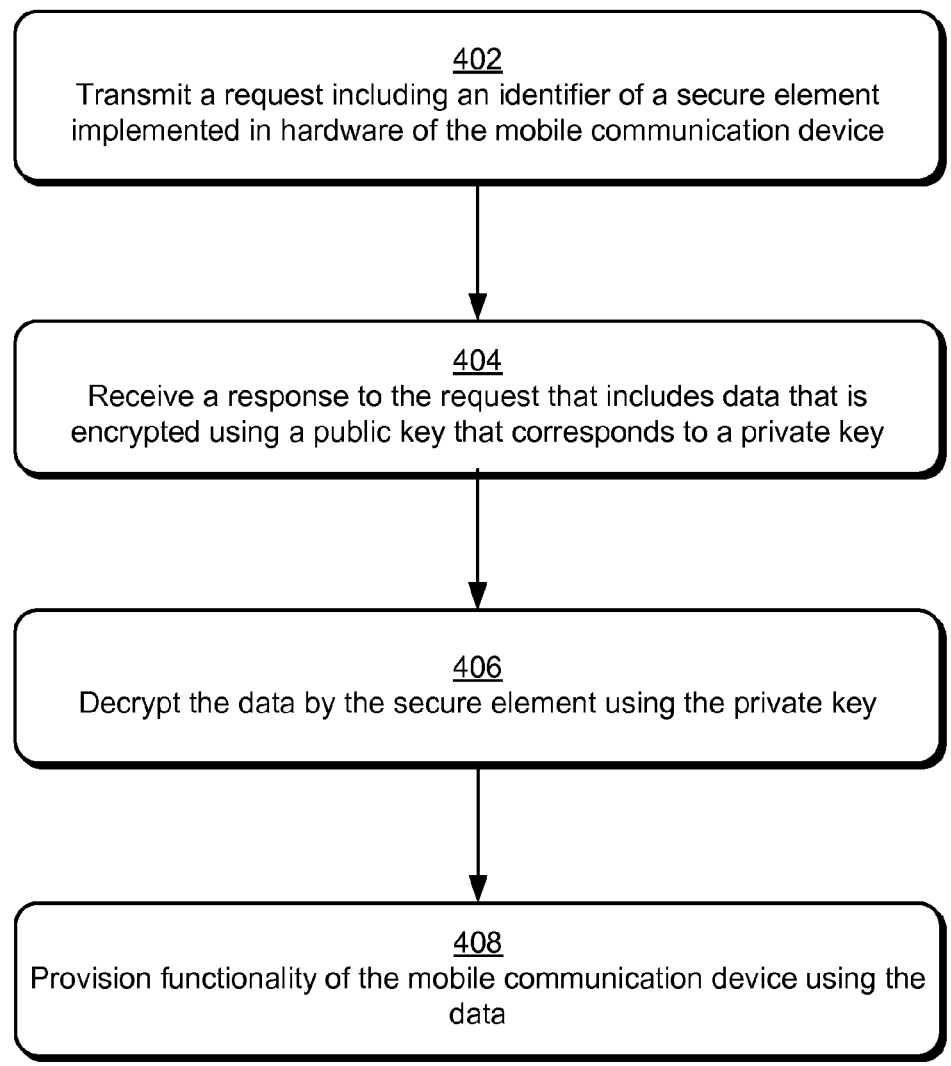
FIG. 4 is a flow diagram depicting a procedure in an example implementation in which a technique to receive and process data received by a mobile communication device from a provisioning service is shown.

FIG. 4 depicts a procedure 400 in an example implementation in which a technique to receive and process data received by a mobile communication device from a provisioning service is shown. A request is transmitted that includes an identifier of a secure element implemented in hardware of the mobile communication device (block 402). As before, the secure element may be identified in a variety of ways, such as through a serial number of an integrated circuit that includes the secure element.

A response is received to the request that includes data that is encrypted using a public key that corresponds to a private key (block 404). The response, for instance, may be obtained directly from a service provider 102 and encrypted using the public key provided by the provisioning service 106. In another instance, the response may be received indirectly via the provisioning service 310 as described in relation to FIG. 3, and so on.

The data is decrypted by the secure element using the private key (block 406). For example, the secure element 112 may be configured using hardware as previously described and include functionality to decrypt the data using the private key 114 without communicating the key "off" an integrated circuit (e.g., computer chip) that implements the element. Functionality of the mobile communication device may then be provisioned using the data (block 408). A variety of different functionality may be provisioned, an example of which is discussed in relation to the following figure.

Figure 5:
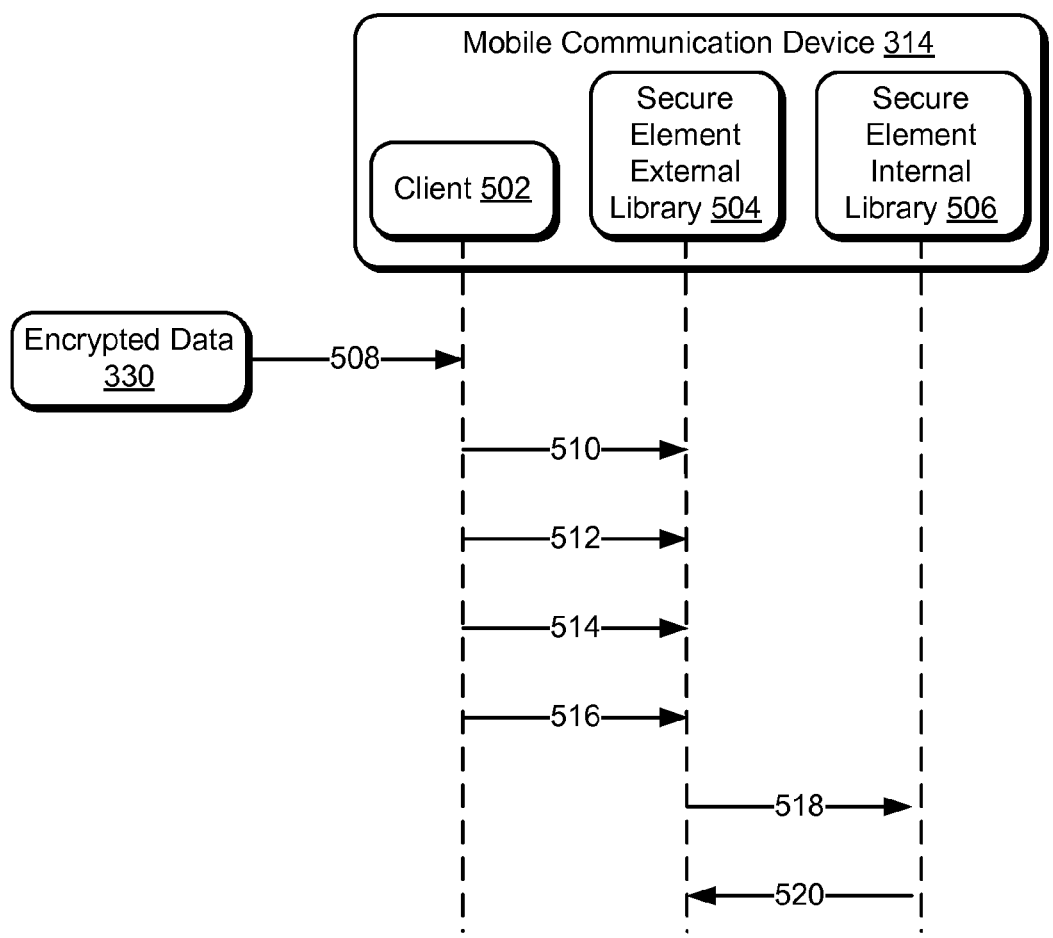
FIG. 5 is a flow diagram depicting a procedure in an example implementation in which example operation of a secure element of FIG. 1 is shown.

FIG. 5 is a flow diagram depicting a procedure in an example implementation in which example operation of a secure element of FIG. 1 is shown. Continuing from FIG. 3, the mobile communication device 314 is illustrated as including a client 502 and a secure element implemented using a secure element external library 504 and a secure element internal library 506.

At arrow 508, the client 502 (e.g., an application) of the mobile communication device 314 is illustrated as receiving the encrypted data 330, e.g., from the provisioning service 310 of FIG. 3. The client 502 may then detect that the data is encrypted and accordingly utilize the secure element to decrypt the data. For example, at arrow 510 the client 502 may initiate the secure element (e.g., an integrated circuit on which the secure element is implemented), initiate an application at arrow 512, perform an authorization handshake at arrow 514, and pass the encrypted data 330 to the secure element external library 504 of the secure element at arrow 516.

The secure element external library 504 may then pass the encrypted data to the secure element internal library 506 at arrow 518, which is then decrypted by the secure element. A result of the decryption is then provided back from the secure element internal library 506 to the secure element external library 504. As previously described, a variety of different examples are also contemplated, such as to keep the data internal to the secure element for subsequent use (e.g., for decryption and/or encryption operations to form a secure channel), expose the data for use by the client 502 (e.g., as credentials for logon, to perform a purchase), and so on. Thus, a variety of different data may be communicated securely to the mobile communication device, such as data to make a purchase using information relating to a credit card, provide an identifier for use as a transit access card, provide an identifier associated with a loyalty card, or provide credentials usable by the mobile communication device to access a premises.

Example Device

Figure 6:
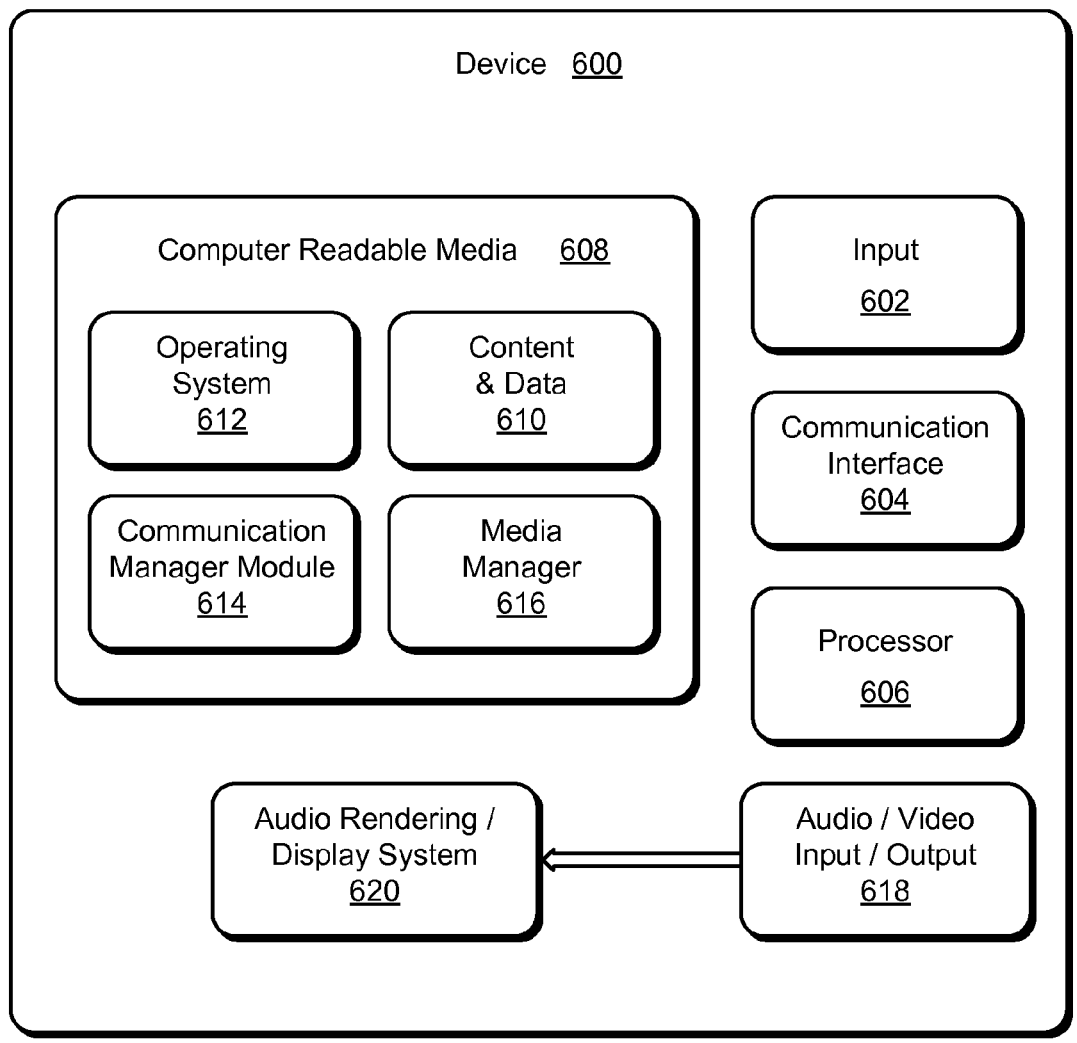
FIG. 6 illustrates various components of an example device that can be implemented in various embodiments as any type of a mobile device to implement embodiments of devices, features, and systems for mobile communications.

FIG. 6 illustrates various components of an example device 600 that can be implemented in various embodiments as any type of a mobile device to implement embodiments of devices, features, and systems for mobile communications. For example, device 600 can be implemented as any of the mobile communication devices 102 described with reference to respective FIGS. 1-3. Device 600 can also be implemented to access a network-based service, such as a social network service as previously described.

Device 600 includes input 602 that may include Internet Protocol (IP) inputs as well as other input devices, such as the keyboard 112 of FIG. 1. Device 600 further includes communication interface 604 that can be implemented as any one or more of a wireless interface, any type of network interface, and as any other type of communication interface.

A network interface provides a connection between device 600 and a communication network by which other electronic and computing devices can communicate data with device 600. A wireless interface enables device 600 to operate as a mobile device for wireless communications.

Device 600 also includes one or more processors 606 (e.g., any of microprocessors, controllers, and the like) which process various computer-executable instructions to control the operation of device 600 and to communicate with other electronic devices. Device 600 can be implemented with computer-readable media 608, such as one or more memory components, examples of which include random access memory (RAM) and non-volatile memory (e.g., any one or more of a read-only memory (ROM), flash memory, EPROM, EEPROM, etc.).

Computer-readable media 608 provides data storage to store content and data 610, as well as device applications and any other types of information and/or data related to operational aspects of device 600. For example, an operating system 612 can be maintained as a computer application with the computer-readable media 608 and executed on processor 606. Device applications can also include a communication manager module 614 (which may be used to provide telephonic functionality) and a media manager 616.

Device 600 also includes an audio and/or video output 618 that provides audio and/or video data to an audio rendering and/or display system 620. The audio rendering and/or display system 620 can be implemented as integrated component(s) of the example device 600, and can include any components that process, display, and/or otherwise render audio, video, and image data. Device 600 can also be implemented to provide a user tactile feedback, such as vibrate and haptics.

Generally, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware or a combination thereof. In the case of a software implementation, the module, functionality, or logic represents program code that performs specified tasks when executed on a processor (e.g., CPU or CPUs). The program code can be stored in one or more computer readable memory devices. The features of the techniques described above are platform-independent, meaning that the techniques may be implemented on a variety of commercial computing platforms having a variety of processors.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a provisioning service, the method comprising:
    locating a particular public key of a plurality of public keys that are stored by the provisioning service, the particular public key corresponding to a particular mobile communication device and located using a particular identifier of the particular mobile communication device that is included in a request received via a network, wherein the particular identifier identifies a secure element of the particular mobile communication device that stores a particular private key corresponding to the particular public key;
    communicating the particular public key of the particular mobile communication device via the network to a service provider; and
    supporting protected communications between the service provider and the particular mobile communication device using the provisioning service as an intermediary,
    wherein the particular public key is configured to encrypt the protected communications,
    wherein the secure element of the particular mobile computing device is implemented using hardware and is configured to decrypt the protected communications using the particular private key,
    wherein the particular private key is not exposed outside of the hardware that implements the secure element, and
    wherein the provisioning service is verified as being prevented from decrypting the protected communications.

2. The method as described in claim 1, wherein the particular identifier is a serial number of an integrated circuit that implements the secure element of the particular mobile communication device.

3. The method as described in claim 1, wherein the plurality of public keys are located on one or more devices of the provisioning service that are auditable by an outside party to determine that information stored by the one or more devices is not configured to decrypt data encrypted by one or more of the plurality of public keys.

4. The method as described in claim 1, wherein the request is received by the provisioning service from the service provider.

5. The method as described in claim 4, wherein the request is sent by the originator service provider to the provisioning service responsive to a request by the particular mobile computing device to obtain an application that is associated with the originator service provider.

6. The method as described in claim 1, wherein the request is received by the provisioning service from the particular computing device.

7. The method as described in claim 6, wherein the request identifies a particular application that the particular mobile communication device is attempting to obtain from the service provider.

8. The method as described in claim 1, wherein the supporting protected communications comprises:
    receiving the protected communications at the provisioning service from the service provider; and
    sending the protected communications from the provisioning service to the particular mobile communication device.

9. The method as described in claim 8, wherein the secure element is configured to decrypt the protected communications without exposing the particular private key.

10. The method as described in claim 1, wherein the particular mobile communication device is configured to include telephone functionality.

11. The method as described in claim 1, wherein the protected communications are usable by the particular mobile communication device to at least one of:
    make a purchase using information relating to a credit card, provide an identifier for use as a transit access card,
provide an identifier associated with a loyalty card, or
provide credentials usable by the particular mobile communication device to access a premises.

12. A mobile computing device comprising:
a secure circuit storing a particular private key of the mobile computing device;
a hardware processor; and
a hardware computer-readable memory device storing instructions which, when executed by the hardware processor, cause the hardware processor to:
send a request to a provisioning service that stores a particular public key that corresponds to the particular private key stored in the secure circuit of the mobile computing device, wherein the request is directed to a service provider to obtain a service from the service provider and includes an identifier of the mobile computing device;
receive, from the provisioning service, encrypted communications generated by the service provider related to the service requested by the mobile computing device; and
decrypt the encrypted communications using the particular private key, wherein
the provisioning service uses the identifier included in the request to retrieve the particular public key and provide the particular public key to the service provider, and
wherein the provisioning service is verified as being prevented from decrypting the encrypted communications.

13. The mobile computing device of claim 12, wherein the identifier included in the request is a serial number of the secure circuit.

14. The mobile computing device of claim 12, wherein the service involves obtaining a third-party application from the service provider.

15. The mobile computing device of claim 12, wherein the encrypted communications comprise other keys provided by the service provider to the mobile computing device.

16. The mobile computing device of claim 15, wherein the instructions, when executed by the hardware processor, cause the hardware processor to:
encrypt other communications with the other keys and send the other communications to the service provider.

17. A provisioning system comprising: a hardware processor; and
a hardware computer-readable memory device storing instructions which, when executed by the hardware processor, cause the hardware processor to:
receive, from a particular mobile computing device, a request to access a third party service, the request including a particular identifier of the particular mobile computing device;
at the provisioning system, identify a particular public key of the particular mobile computing device using the particular identifier, wherein the particular mobile computing device stores a corresponding particular private key that is not accessible to the provisioning system;
send the particular public key of the particular mobile computing device from the provisioning system to the third party service;
receive encrypted communications from the third party service, the encrypted communications being encrypted with the particular public key of the particular mobile computing device; and
send the encrypted communications to the particular mobile computing device,
wherein the provisioning system is verified as being prevented from decrypting the encrypted communications.

18. The provisioning system of claim 17, wherein the particular identifier is a serial number of a secure component on the particular mobile computing device.

19. The provisioning system of claim 17, wherein the particular identifier is a serial number of a secure integrated circuit on the particular mobile computing device.

20. The provisioning system of claim 19, wherein the instructions, when executed by the hardware processor, cause the hardware processor to:
identify the particular public key by:
sending the serial number of the secure integrated circuit to an auditable reference service; and
in response, receiving the particular public key from the auditable reference service.

* * * * *